(No Model.) 2 Sheets—Sheet 1.
O. AMES.
PNEUMATIC CASH CARRIER APPARATUS.
No. 527,040. Patented Oct. 9, 1894.
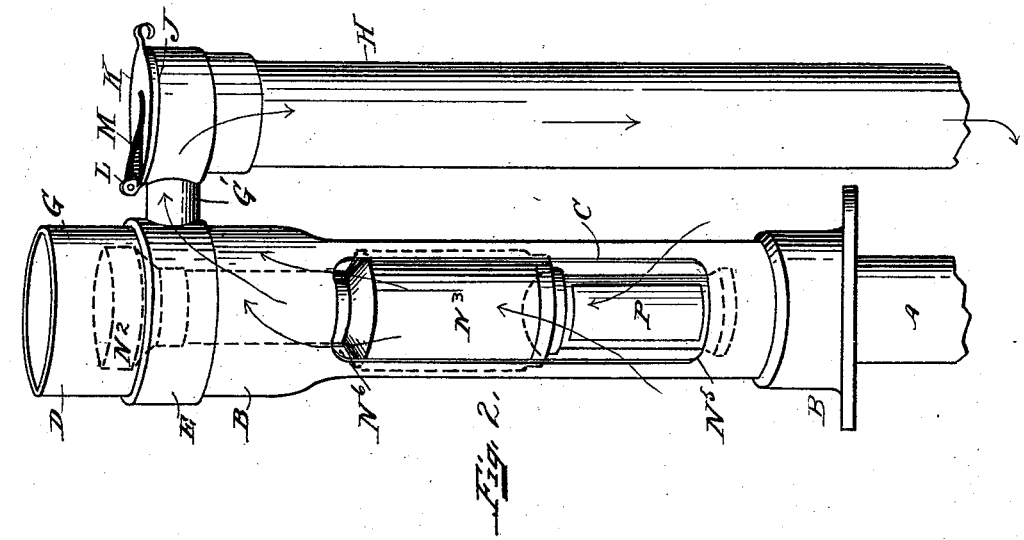
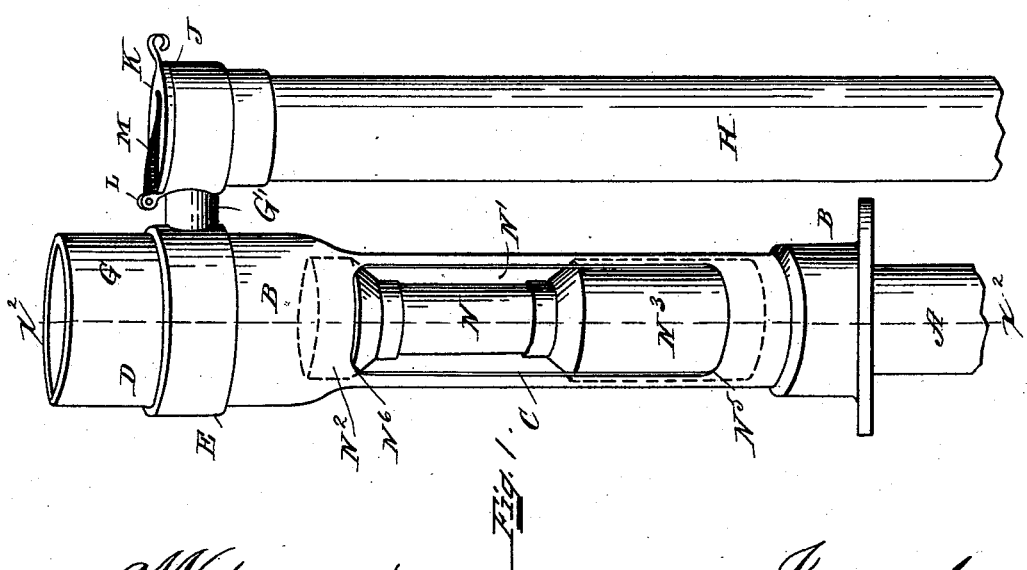

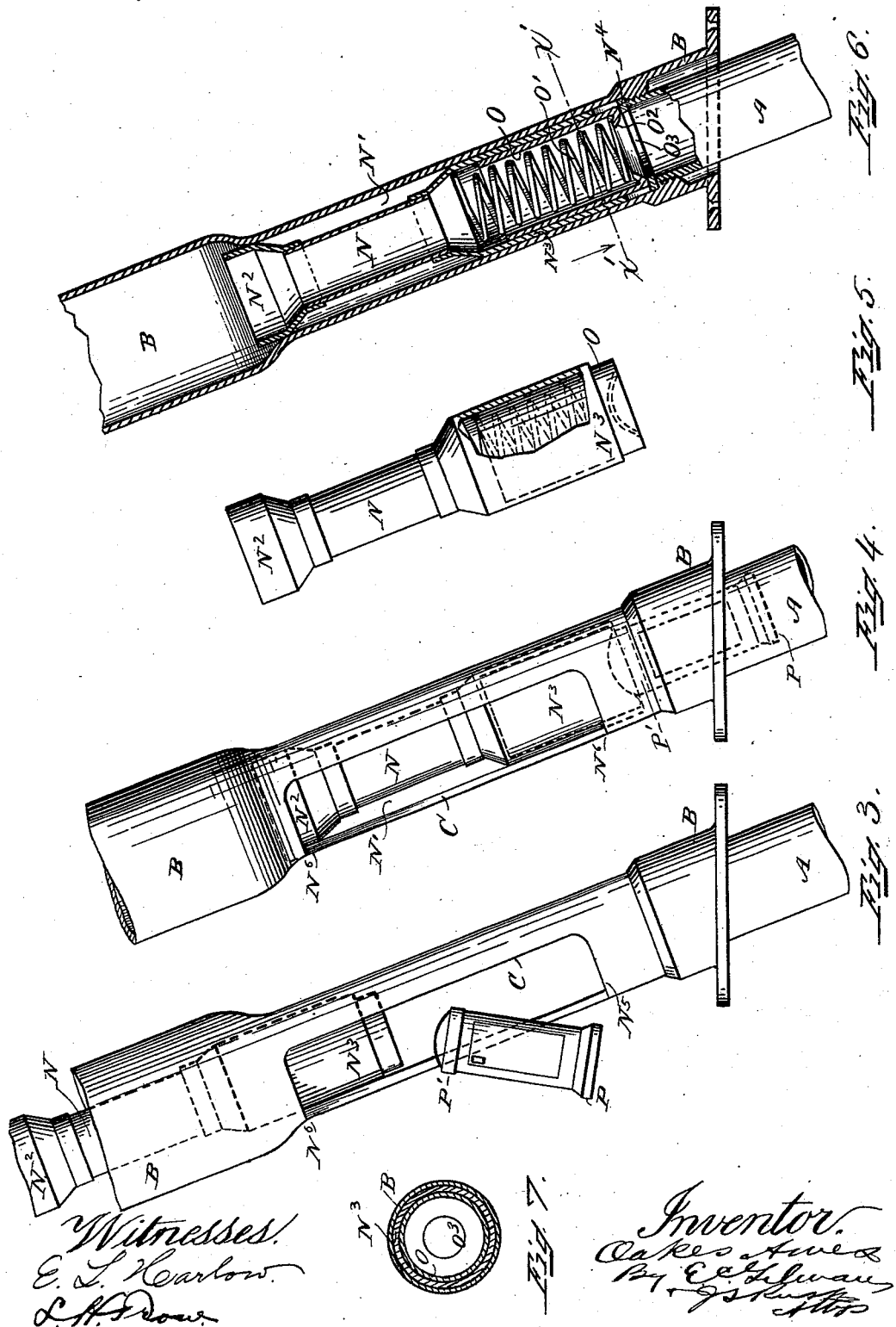

UNITED STATES PATENT OFFICE.

OAKES AMES, OF CANTON, MASSACHUSETTS, ASSIGNOR TO THE METEOR DESPATCH COMPANY, OF PORTLAND, MAINE, AND BOSTON, MASSACHUSETTS.

PNEUMATIC CASH-CARRIER APPARATUS.

SPECIFICATION forming part of Letters Patent No. 527,040, dated October 9, 1894.

Application filed February 12, 1894. Serial No. 499,879. (No model.)

*To all whom it may concern:*

Be it known that I, OAKES AMES, of Canton, county of Norfolk, and Commonwealth of Massachusetts, have invented certain new and useful Improvements in Pneumatic Cash-Carrier Apparatus; and I do hereby declare that the following is a full, clear, and exact description of the invention, which will enable others skilled in the art to which it appertains to make and use the same.

This invention relates to improvements in pneumatic dispatch tube systems for the transmission of a carrier through the same, and it relates especially to certain constructions at the delivery end of the tube for taking up the momentum of the carrier as it reaches said end, and to permit the delivery at said delivery end of the carrier from the pneumatic tube.

The invention is shown as applied to pneumatic systems at the salesman's counter, but its operation and construction will be substantially the same at the cashier's desk, except at the cashier's desk the carrier is delivered downwardly instead of upwardly, as is the case at the salesman's counter.

In the accompanying drawings:—Figure 1 represents a front view of a pneumatic dispatch tube system at the salesman's counter, with the parts all in their normal positions. Fig. 2 is a like view showing a change of position of one of the parts. Figs. 3 and 4 represent side elevations of a pneumatic dispatch tube system at the salesman's counter, Fig. 3 showing the location of the parts when the carrier is dropped from the pneumatic tube, and Fig. 4 shows the location of the parts as the carrier approaches the opening in the pneumatic tube at the salesman's counter. Fig. 5 is a detail view partly broken away to show the construction and arrangement of the sliding tube located within the dispatch tube at the salesman's counter. Fig. 6 is a vertical cross-section on the line $x\, x$ of Fig. 1 with the parts in their normal positions. Fig. 7 is a cross-sectional view taken on the line $x'\, x'$ of Fig. 6.

Like letters of reference refer to like parts throughout the several views.

This application relates to improvements of pneumatic dispatch tube systems shown in patents to John L. Given, No. 379,890, dated March 20, 1888, and No. 411,334, dated September 17, 1889.

In the drawings A represents the end of a pneumatic dispatch tube for the transmission of a carrier, and is secured by a screw thread, as shown in Fig. 6, to the lower end of the standard B. The standard B is constructed in a tubular form and forms substantially a continuation of the pneumatic tube A, and there is provided in the front of said standard at the middle of its length an opening C, to permit of the delivery of the carrier from the pneumatic tube, and in order to facilitate the delivery of the carrier to the salesman the standard is arranged as shown in Figs. 3 and 4 in an inclined or angular position to the salesman's desk, with the delivery opening C on the under or front side, as shown in said figures. The upper end of the standard B is enlarged as shown in the drawings, and has at the upper end a cap D which screws on to a sleeve or coupling E, which sleeve in turn screws on to the upper end of the standard B, as shown in Figs. 1 and 2. The cap D forms a chamber G at the upper end of the standard B (see Fig. 2) for a purpose hereinafter described.

Into the side of the sleeve E a hollow coupling G' is screwed, and the opposite end of the coupling is screwed into the end of the pneumatic tube H, thereby forming an open communication between the upper end of the standard B and the pneumatic tube H, and providing an uninterrupted passage for the air.

As shown in Figs. 1 and 2 the tube A represents a portion of the main tube for the delivery of the carrier at the salesman's station, and the tube H represents that portion of the pneumatic dispatch tube system forming the return tube for sending the carrier through the same from the salesman's counter to the cashier's end, or for communicating with the air exhaust apparatus for the proper exhaust of air through the pneumatic dispatch tube system for the transmission of the carrier, and when said tube H is used as a means of returning the carrier to the cashier's desk it is provided with an opening J covered by a valve K pivoted at L, and a rib M is provided to strengthen the cover K. This return tube H may or may not be inclined, as the working of the system does not require any angle of inclination.

Within the standard B there is arranged a short tube N open from end to end, as shown in Fig. 6, and having its exterior diameter less than the internal diameter of the standard, leaving a space N' around the same between it and the standard, and on the top and bottom of the tube N are provided the flanges $N^2$, $N^3$, both of which closely fit the interior of the standard so as to prevent air from passing from the outside into the upper end of the standard B, and yet sufficiently loose to permit the tube N to slide freely up and down in the operation of the system. When the sliding tube N is in its normal position, as shown at Fig. 1, and closing the delivery opening C, its lower end rests upon the upper end of the pneumatic dispatch tube A, or, more strictly, it rests upon the packing $N^4$ located around the upper end of the tube A, and in this position the two flanges $N^2$ and $N^3$ cover the lower end $N^5$ and the upper end $N^6$ of the delivery opening C so as to prevent communication of the outside air with the pneumatic system at the said delivery opening. In this position of the parts the air passes through the tube A, up through the sliding tube N, out through the chamber G, through the coupling G' into the return tube H to the air exhausting apparatus. Now if the sliding tube N is moved up into the position shown in Fig. 2 by the carrier abutting the lower end of said tube, the upper flange $N^2$ of the said tube will be above the coupling G' and the lower flange $N^3$ below the upper end $N^6$ of the delivery opening C, so that the outside air can then pass freely in at the delivery opening between the sliding tube and the standard and out through the coupling G' into the return tube and back to the air exhaust.

In the form of apparatus now in use when the carrier approaches either the cashier's end or the salesman's end it strikes the sliding tube with considerable force, and as the sliding tube provides no means at the end where the carrier contacts with it to take up this momentum, it happens that the carrier moves the sliding tube but a short distance and drops back into the tube from which it receives fresh impulse and again strikes the sliding tube, so that it will happen that the tube and the carrier will move up and down a slight distance several times before the carrier is able to move the tube a sufficient distance to permit the carrier to drop from the tube through the delivery opening. This continued driving of the carrier against the tube materially injures the carrier and shortens its existence.

Now it is the purpose of my invention to provide at the lower end of the sliding tube N a cushioning device for taking up the blow of the carrier when it contacts with the lower end of the sliding tube N. The momentum of the carrier thus being cushioned it happens that the tube N and the carrier P move up easily to the upper position as shown in Fig. 3, and the carrier drops from the pneumatic system to the salesman's counter.

The construction of the cushioning device at the lower end of the sliding tube N is shown in section Figs. 5 and 6. It consists of a cylinder O open at both ends and located within the interior of the flange $N^3$ of the tube N, and is adapted to slide up and down within said flange $N^3$. A spring O' is secured at its upper end to the interior of the flange $N^3$, and its lower end rests in the cavity $O^2$ at the bottom of the cylinder O and is secured therein, and $O^3$ is the opening provided in the bottom of the cushioning device.

As the carrier P strikes the bottom of the cylinder O the spring O' is compressed and thereby takes up the momentum of the carrier, and the cylinder O takes the position shown in dotted lines, Fig. 4; that is, it is moved up farther into the interior of the flange $N^3$ of the sliding tube N, and the carrier and tube move up as indicated in Fig. 2 until the tube reaches the position shown in Fig. 3 and the carrier is delivered from the delivery opening C.

The standard and the pneumatic tube are connected with the exhaust apparatus for the exhaustion of the air in the direction of the arrows, and as the carrier P moves along the tube A by reason of the air being exhausted in front of it it reaches and contacts with the open lower end of the sliding tube N, it closes the lower opening of said tube to the passage of air, and when the sliding tube moves up with the carrier, as shown in Fig. 2, the air passes from the outside into the system at the top of the delivery opening C, and thence through the system as shown by the arrows to the air exhaust apparatus, thus relieving the pressure of air in front of the carrier which then releases its hold with the sliding tube and drops out of the standard, as indicated at Fig. 3. As soon as the carrier is released from the lower end of the sliding tube air can then pass through said tube, which thus relieving the pressure on the top of the tube causes the said tube N to fall by gravity to its normal position, closing the delivery opening C to the entrance of the outside air so that the pneumatic system is in condition for the exhaustion of air therefrom for the transmission of another carrier through the tube to the delivery opening.

The carrier is returned to the cashier's desk by opening the valve K, placing the carrier in the opening of the tube H with the front end P' downward, and then closing the valve K, and the carrier is drawn along the return tube to the cashier's station by the air exhausting apparatus.

I do not limit myself to the exact arrangements and constructions shown, as the same may be varied without departing from the spirit of my invention.

Having thus ascertained the nature and set forth the construction of my invention, what I claim as new, and desire to secure by Letters Patent of the United States, is—

1. The combination with a pneumatic dispatch tube provided with an opening or outlet for the delivery of the carrier from the pneumatic tube, of an open ended sliding tube adapted to move back and forth in said tube to open and close said opening and provided with a cushioning device located at that end of the tube with which the carrier contacts to take up the momentum of the carrier as it contacts with said device.

2. The combination with a pneumatic dispatch tube provided with an opening or outlet for the delivery of the carrier from the pneumatic tube, of an open ended sliding tube adapted to move back and forth in said tube to open and close said opening and provided with a cushioning device located within one end of the said sliding tube to take up the momentum of the carrier as it contacts with said device.

In testimony whereof I have signed my name to this specification, in the presence of two subscribing witnesses, on this 3d day of February, 1894.

OAKES AMES.

Witnesses:
A. S. TEMPLE,
F. A. SPEAR.